United States Patent Office 2,967,195
Patented Jan. 3, 1961

2,967,195

POLYNITROALKYL ESTERS OF ALKENOIC ACIDS

Marvin H. Gold, Pasadena, Calif., assignor to Aerojet-General Corporation, Azusa, Calif., a corporation of Ohio No Drawing. Filed Dec. 8, 1953, Ser. No. 397,006

20 Claims. (Cl. 260—486)

This invention relates to new compositions of matter. In particular this invention relates to polymerizable-dinitro-containing esters having the general formula:

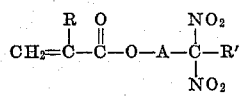

wherein R is a hydrogen or alkyl radical, R' is an alkyl radical, and A is an alkylene radical containing 1 to 2 carbon atoms, inclusive.

These esters readily undergo polymerization to form compositions exhibiting high impact stability and propellant power and having a wide range of uses as propellant fuel components and desensitizers for high explosives as more fully disclosed in my copending application Number 397,007, filed December 8, 1953.

The compounds of this invention are readily prepared by the direct esterification of acrylic acid or homologue of acrylic acid with a dinitro-containing aliphatic alcohol in accordance with the general reaction scheme set forth below:

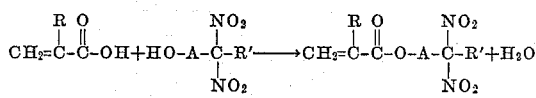

wherein R is a hydrogen or alkyl radical, R' is an alkyl radical and A is an alkylene radical.

A variety of reaction media and catalysts may be employed in this reaction without departing from the scope of the invention. Any inert solvent such as benzene, toluene, dioxane, hexane, etc., may be used in this process. In addition conventional esterification catalysts, such as the mineral acids, have also been found to be useful.

The following examples are presented to more clearly illustrate my invention. It is to be understood, however, that these examples are presented merely as a means of illustration and are not intended to limit the scope of my invention in any way.

EXAMPLE I

*Preparation of 2,2-dinitro-1-butyl acrylate*

A mixture of 2462 gm. (15 moles) of 2,2-dinitro-butanol 1927 gm. (18 moles) acrylic acid, 100 gm. copper turnings, and 5.5 liters benzene were placed in a reactor fitted with a Dean Stark water trap and reflux condenser in series. The solution, dried by refluxing for a short time, was cooled and 5 ml. concentrated sulfuric acid was added. The mixture was then refluxed for about 100 hours. Sulfuric acid, in 5 ml. amounts, was added after the first 24 hours of refluxing and at 12 hour intervals thereafter. The mixture was then again cooled to room temperature and filtered. The filtrate was washed with water and distilled at reduced pressure, to remove the benzene. The residue obtained from the distillation was further dried under vacuum. The product, a faintly yellow colored liquid (B.P. 95–100° C./1 mm.; 74–77° C./0.5 mm., $n_D^{25}$ 1.4570–1.4583), was recovered in 71–72% yield.

EXAMPLE II

*Preparation of 3,3-dinitro-1-butyl acrylate*

A reactor provided with a Dean Stark water separator, thermometer, and stirrer was charged with 82 gm. 3,3-dinitrobutanol, 93.6 gm. glacial acrylic acid and 300 ml. benzene. One ml. concentrated sulfuric acid was added and the mixture was refluxed for 10 hours. After cooling, the solution was washed with water, dilute sodium hydroxide and again with water. The benzene solution was then dried over sodium sulfate, filtered and concentrated. The remaining viscous oil was distilled to yield 82 gm. of faintly yellow 3,3-dinitrobutyl acrylate, $n_D^{25}$ 1.4660. Elemental analysis of the product is as follows:

Calculated for $C_7H_{10}N_2O_6$: Percent C, 38.77; percent H, 4.68; percent N, 12.86. Found: Percent C, 38.00; percent H, 4.77; percent N, 12.62.

EXAMPLE III

*Preparation of 2,2-dinitro-1-butyl methacrylate*

A solution of 115 gm. (1.2 mole) of 90% aqueous methacrylic acid in 51 ml. of benzene was refluxed on a steam bath under a Dean Stark trap until anhydrous. One gm. of trinitro-benzene, 164 gm. (1 mole) of 2,2-dinitrobutanol, 30 ml. of benzene, and 4 ml. of concentrated sulfuric acid were then added. The reaction mixture was refluxed for a total of 48 hours. After the first 24 hours, 4 ml. of concentrated sulfuric acid were added. The black mixture was filtered and the filtrate washed with water and a saturated sodium bicarbonate solution. The reaction mixture was then concentrated under vacuum and distilled, yielding a colorless liquid. The yield of 2,2-dinitro-1-butyl methacrylate was 167 gm. (71.4%); B.P. 124° C. (2 mm.); $n_D^{25}$ 1.4588; $d_4^{25}$ 1.2252; M.D. (calc.), 51.63; M.D. (found), 51.79. The elemental analysis of the product is as follows:

Calculated for $C_8H_{12}N_2O_6$: Percent C, 41.38; percent H, 5.22; percent N, 12.07. Found: Percent C, 40.80; percent H, 5.45, percent N, 11.48.

EXAMPLE IV

*Preparation of 2,2-dinitro-1-pentyl acrylate*

2,2-dinitro-pentyl acrylate was prepared from 2,2-dinitro-pentanol and acrylic acid through direct esterification by following the procedure prescribed in Example I. The oil obtained was distilled at 8 microns pressure and at a temperature of 73–74° C. The yield was 11 gm., $n_D^{25}$ 1.4571. The elemental analysis of the product is as follows:

Calculated for $C_8H_{12}N_2O_6$: Percent C, 41.38 percent H, 5.21; percent N, 12.07. Found: Percent C, 40.89; percent H, 5.19; percent N, 12.63.

EXAMPLE V

*Preparation of 2,2-dinitro-1-propyl acrylate*

A mixture of 300 gm. (2 moles) of 2,2-dinitro propanel, 156 gm. (2.2 moles) of acrylic acid, 4.5 gm. of p-toluene sulfonic acid, 6 gm. of copper filings were charged to a reactor fitted with a reflux condenser and a water trap. The mixture was refluxed for 4 hours. The elemental analysis of the product, B.P. 71° C./0.4 mm., $n_D^{25}$ 1.4610, is as follows:

Calculated for $C_6H_8N_2O_6$: Percent C, 35.30; percent H, 3.95; percent N, 13.73. Found: Percent C, 34.81; percent H, 3.63; percent N, 14.22.

EXAMPLE VI

*Preparation of 2,2-dinitro-1-propyl methacrylate*

A mixture of 50 ml. of benzene, 115 gm. of methacrylic acid (90%) and 0.5 gm. trinitrobenzene were refluxed until anhydrous. 150 gm. dinitro-1-propanol, 300 ml. benzene, and 4 ml. sulfuric acid were added and the mixture was refluxed until the evolution of water ceased. The reaction mixture was washed with sodium bicarbonate, sodium bisulfite and water and then dried. The remaining viscous oil was dissolved in 500 ml. hexane, refluxed, filtered and distilled. The yield was 159 gm. (50%), boiling point 89–93° C., 8 microns, $n_D^{25}$ 1.4582 and the elemental analysis of the product is as follows:

Calculated for $C_7H_{10}N_2O_6$: Percent C, 38.53; percent H, 4.62; percent N, 12.84. Found: Percent C, 38.56; percent H, 4.90; percent N, 13.70.

The dinitro-alcohols used as starting materials in this invention are readily prepared by the addition of a labile hydrogen containing nitroalkane to an aldehyde such as formaldehyde, acetaldehyde, or acrolein; the resulting nitronate salt may then be oxidatively nitrated with an alkali nitrite in the presence of silver nitrate to produce the desired dinitro alcohol. Since nitro containing methanes, ethanes, propanes, butanes, pentanes, hexanes, heptanes, octanes, nonanes etc., readily undergo condensation with unsaturated aldehydes and subsequent oxidative nitration, a wide variety of dinitro alcohols may be prepared in this manner.

As may be seen from the foregoing discussion, merely by selecting the appropriate starting materials and proceeding in accordance with this invention, a wide variety of compounds of the class disclosed may be prepared. Thus by condensing such alcohols as 2,2-dinitrobutanol, 3,3-dinitrobutanol, 2,2-dinitropentanol, 2,2-dinitrohexanol, 2,2-dinitropropanol, 2,2-dinitro-4-methyl-pentanol, 2,2-dinitro-4,4-dimethyl pentanol, etc., with an alkenoic acid such as acrylic acid, methacrylic acid and their higher homologues, a wide variety of these desirable esters may be obtained.

I claim:

1. As new compositions of matter the nitro substituted alkyl alkenoates having the general formula:

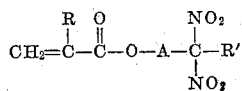

wherein R is a radical selected from the group consisting of hydrogen and lower alkyl radicals, R' is a lower alkyl radical and A is an alkylene radical having from 1 to 2 carbon atoms inclusive.

2. As new compositions of matter the nitro alkyl acrylates having the general formula:

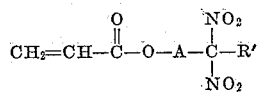

wherein A is an alkylene radical having from 1 to 2 carbon atoms inclusive and R' is a lower alkyl radical.

3. As new compositions of matter the nitro alkyl methacrylates having the general formula:

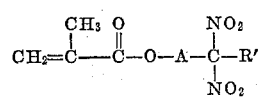

wherein A is an alkylene radical having from 1 to 2 carbon atoms inclusive and R' is an alkyl radical.

4. As a new composition of matter 2,2-dinitro-1-butyl acrylate having the structural formula:

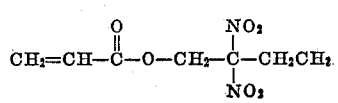

5. As a new composition of matter, 3,3-dinitro-1-butyl acrylate having the structural formula:

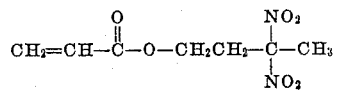

6. As a new composition of matter 2,2-dinitro-1-butyl methacrylate having the structural formula:

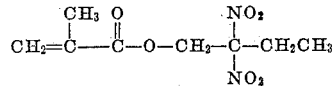

7. As a new composition of matter 2,2-dinitro-1-pentyl acrylate having the structural formula:

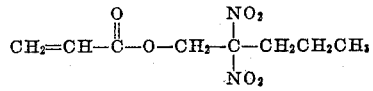

8. As a new composition of matter 2,2-dinitro-1-propyl acrylate having the structural formula:

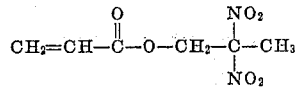

9. As a new composition of matter 2,2-dinitropropyl methacrylate having the structural formula:

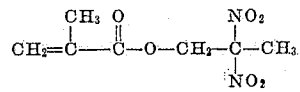

10. The method of preparing nitro alkyl acrylates having the general formula:

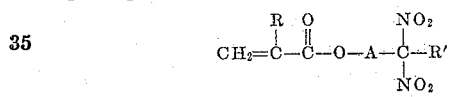

wherein R is a radical selected from the group consisting of hydrogen and lower alkyl radicals, A is an alkylene radical having from 1 to 2 carbon atoms and R' is a lower alkyl radical which comprises condensing an alkenoic acid having the general formula:

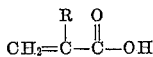

wherein R is a radical selected from the group consisting of hydrogen and lower alkyl radicals with an alcohol having the general formula:

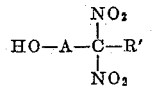

wherein A is an alkylene radical having from 1 to 2 carbon atoms and R' is a lower alkyl radical.

11. A method of preparing a nitro alkyl acrylate having the general formula:

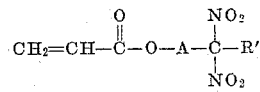

wherein A is an alkylene radical having from 1 to 2 carbon atoms inclusive and R' is a lower alkyl radical, which comprises condensing an alcohol having the general formula:

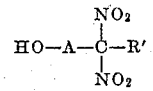

wherein A and R' are as defined above, with acrylic acid.

12. The method of preparing a nitro alkyl methacrylate having the general formula:

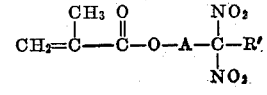

wherein A is an alkylene radical having from 1 to 2 carbon atoms inclusive and R' is an alkyl radical, which comprises condensing an alcohol having the general formula:

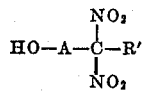

wherein A and R' are as defined above, with methacrylic acid.

13. The method of claim 10 wherein the condensation is conducted in the presence of a strong mineral acid esterification catalyst.

14. The method of claim 13 wherein sulfuric acid is used as the esterification catalyst.

15. The method of preparing 2,2-dinitro-1-butyl acrylate which comprises condensing 2,2-dinitro butanol with acrylic acid.

16. The method of preparing 3,3-dinitro-1-butyl acrylate which comprises condensing 3,3-dinitro butanol with acrylic acid.

17. The method of preparing 2,2-dinitro-1-butyl methacrylate which comprises condensing 2,2-dinitro butanol with methacrylic acid.

18. The method of preparing 2,2-dinitro-1-pentyl acrylate which comprises condensing 2,2-dinitro pentanol with acrylic acid.

19. The method of preparing 2,2-dinitro-1-propyl acrylate which comprises condensing 2,2-dinitro propanol with acrylic acid.

20. The method of preparing 2,2-dinitro-1-propyl methacrylate which comprises condensing 2,2-dinitro propanol with methacrylic acid.

References Cited in the file of this patent

UNITED STATES PATENTS

| | | |
|---|---|---|
| 2,378,169 | Agre et al. | June 12, 1945 |
| 2,404,688 | Bruson et al. | July 23, 1946 |
| 2,449,804 | D'Alelio et al. | Sept. 21, 1948 |
| 2,522,959 | Plaut | Sept. 19, 1950 |
| 2,710,830 | Roy | June 14, 1955 |

OTHER REFERENCES

Shechter et al.: J.A.C.S., vol. 74, pages 3664–68, July 20, 1952.